(12) United States Patent
Essinger, Jr. et al.

(10) Patent No.: US 11,109,588 B2
(45) Date of Patent: Sep. 7, 2021

(54) STABLE LIQUID FORMULATIONS AND METHODS OF USING THE SAME

(71) Applicant: GOWAN COMPANY, L.L.C., Yuma, AZ (US)

(72) Inventors: James Franklin Essinger, Jr., Yuma, AZ (US); Lin Gan, Yuma, AZ (US); Nihal Johnny Behrens, Yuma, AZ (US)

(73) Assignee: GOWAN COMPANY, L.L.C., Yuma, AZ (US)

( * ) Notice: Subject to any disclaimer, the term of this patent is extended or adjusted under 35 U.S.C. 154(b) by 0 days.

(21) Appl. No.: 16/795,372

(22) Filed: Feb. 19, 2020

(65) Prior Publication Data

US 2020/0260722 A1    Aug. 20, 2020

Related U.S. Application Data

(60) Provisional application No. 62/807,670, filed on Feb. 19, 2019.

(51) Int. Cl.
| | | |
|---|---|---|
| *A01N 25/04* | (2006.01) | |
| *A01N 25/30* | (2006.01) | |
| *A01N 43/54* | (2006.01) | |
| *A01N 43/66* | (2006.01) | |
| *A01N 41/10* | (2006.01) | |
| *A01N 37/10* | (2006.01) | |

(52) U.S. Cl.
CPC ............ *A01N 25/04* (2013.01); *A01N 25/30* (2013.01); *A01N 43/54* (2013.01); *A01N 37/10* (2013.01); *A01N 41/10* (2013.01); *A01N 43/66* (2013.01)

(58) Field of Classification Search
None
See application file for complete search history.

(56) References Cited

U.S. PATENT DOCUMENTS

| | | |
|---|---|---|
| 5,163,996 A | 11/1992 | Meyer |
| 5,981,432 A | 11/1999 | Hudetz et al. |
| 6,046,134 A | 4/2000 | De Gennaro et al. |
| 6,093,680 A | 7/2000 | Gillespie et al. |
| 6,093,681 A | 7/2000 | Ward et al. |
| 6,114,283 A | 9/2000 | Edmund et al. |
| 6,130,186 A | 10/2000 | Ward et al. |
| 6,184,182 B1 | 2/2001 | Gillespie et al. |
| 6,380,135 B1 | 4/2002 | Reuter et al. |
| 6,403,531 B1 | 6/2002 | Rüegg et al. |
| 6,479,432 B1 | 11/2002 | Sixl |
| 6,479,434 B1 | 11/2002 | Gillespie et al. |
| 6,486,096 B1 | 11/2002 | Hacker et al. |
| 6,992,045 B2 * | 1/2006 | Xu .................... A01N 37/04 504/206 |
| 7,012,040 B2 | 3/2006 | Hacker et al. |
| 7,160,841 B2 | 1/2007 | Fujita et al. |
| 7,375,058 B2 | 5/2008 | Zagar et al. |
| 7,776,792 B2 | 8/2010 | Maier et al. |
| 7,867,946 B2 | 1/2011 | Deckwer et al. |
| 7,981,839 B2 | 7/2011 | Yoshii et al. |
| 8,133,850 B2 | 3/2012 | Patel et al. |
| 8,158,557 B2 | 4/2012 | Schnabel et al. |
| 8,193,198 B2 | 6/2012 | Ko et al. |
| 8,288,318 B2 | 10/2012 | Epp et al. |
| 8,293,733 B2 | 10/2012 | Casana et al. |
| 8,298,990 B2 | 10/2012 | Wu et al. |
| 8,404,260 B2 | 3/2013 | Reid et al. |
| 8,449,917 B2 | 5/2013 | Dave et al. |
| 8,501,667 B2 | 8/2013 | Ishihara et al. |
| 8,575,067 B2 | 11/2013 | Yoshii et al. |
| 8,609,935 B2 | 12/2013 | Kinney et al. |
| 8,680,339 B2 | 3/2014 | Mathews et al. |
| 8,791,049 B2 | 7/2014 | Webster et al. |
| 8,802,597 B2 | 8/2014 | Clark et al. |
| 8,809,232 B2 | 8/2014 | Yerkes et al. |
| 8,952,024 B2 | 2/2015 | Patel et al. |
| 9,095,133 B2 | 8/2015 | Magdassi et al. |
| 9,370,183 B2 | 6/2016 | Hain et al. |
| 9,445,591 B2 | 9/2016 | Dave et al. |
| 9,630,910 B2 | 4/2017 | Lo et al. |
| 9,635,854 B2 | 5/2017 | Shinn et al. |
| 9,635,859 B2 | 5/2017 | Lo et al. |
| 9,655,365 B2 | 5/2017 | Niyaz et al. |
| 9,686,994 B2 | 6/2017 | Hain et al. |
| 9,701,620 B2 | 7/2017 | Lo et al. |
| 9,708,288 B2 | 7/2017 | Buysse et al. |
| 9,763,450 B2 | 9/2017 | Roechling et al. |
| 9,999,222 B2 | 6/2018 | Major et al. |
| 10,051,865 B2 | 8/2018 | Bristow |
| RE47,128 E | 11/2018 | Webster et al. |
| 10,118,917 B2 | 11/2018 | Selby et al. |
| 10,159,249 B2 | 12/2018 | Poree et al. |
| 10,294,202 B2 | 5/2019 | Satterfield et al. |
| 10,631,539 B2 | 4/2020 | Hoffman et al. |

(Continued)

FOREIGN PATENT DOCUMENTS

| | | |
|---|---|---|
| AU | 2003303027 B2 | 7/2010 |
| CA | 2408350 A1 | 11/2002 |

(Continued)

OTHER PUBLICATIONS

International Search Report and Written Opinion for PCT/US2020/018860 dated May 15, 2020.

*Primary Examiner* — Alton N Pryor

(74) *Attorney, Agent, or Firm* — Arent Fox LLP

(57) ABSTRACT

Liquid compositions of chemically unstable pesticides and methods of using the same are provided.

32 Claims, 1 Drawing Sheet

(56) References Cited

U.S. PATENT DOCUMENTS

| | | |
|---|---|---|
| 10,729,133 B2 | 8/2020 | Peng et al. |
| 2001/0051175 A1 | 12/2001 | Strom et al. |
| 2002/0042345 A1 | 4/2002 | Kocur et al. |
| 2002/0055436 A1 | 5/2002 | Krause et al. |
| 2002/0094934 A1 | 7/2002 | Hacker et al. |
| 2003/0004064 A1 | 1/2003 | Ahrens et al. |
| 2003/0050193 A1 | 3/2003 | Bieringer et al. |
| 2003/0060367 A1 | 3/2003 | Bieringer et al. |
| 2003/0069136 A1 | 4/2003 | Ruegg et al. |
| 2003/0100449 A1 | 5/2003 | Maeda et al. |
| 2003/0181333 A1 | 9/2003 | Hacker et al. |
| 2004/0023801 A1 | 2/2004 | Asrar et al. |
| 2004/0023802 A1 | 2/2004 | Asrar et al. |
| 2004/0033897 A1 | 2/2004 | Haas |
| 2004/0171489 A1 | 9/2004 | Hacker et al. |
| 2004/0235665 A1 | 11/2004 | Zagar et al. |
| 2004/0259732 A1 | 12/2004 | Asrar et al. |
| 2005/0026783 A1 | 2/2005 | Hacker et al. |
| 2005/0026784 A1 | 2/2005 | Hacker et al. |
| 2005/0037923 A1 | 2/2005 | Zagar et al. |
| 2005/0070437 A1 | 3/2005 | Hacker et al. |
| 2005/0238693 A1 | 10/2005 | Whyte |
| 2005/0250647 A1 | 11/2005 | Hills et al. |
| 2005/0252408 A1 | 11/2005 | Richardson et al. |
| 2006/0154824 A1 | 7/2006 | Yoshii et al. |
| 2006/0205599 A1 | 9/2006 | Hacker et al. |
| 2007/0054805 A1 | 3/2007 | Krause et al. |
| 2007/0054806 A1 | 3/2007 | Krause et al. |
| 2008/0132414 A1 | 6/2008 | Zawierucha et al. |
| 2008/0146445 A1 | 6/2008 | De Kerpel et al. |
| 2008/0234130 A1 | 9/2008 | McCutchen et al. |
| 2008/0254983 A1 | 10/2008 | Panayi et al. |
| 2008/0254985 A1 | 10/2008 | Zagar et al. |
| 2008/0312082 A1 | 12/2008 | Kinney et al. |
| 2009/0029862 A1 | 1/2009 | Yoshii et al. |
| 2009/0131257 A1 | 5/2009 | Beestman et al. |
| 2009/0156400 A1 | 6/2009 | Bieringer et al. |
| 2010/0099562 A1 | 4/2010 | Hills et al. |
| 2010/0099564 A1 | 4/2010 | Hacker et al. |
| 2010/0190794 A1 | 7/2010 | Hupe et al. |
| 2010/0204046 A1 | 8/2010 | Helms et al. |
| 2010/0248965 A1 | 9/2010 | Hacker et al. |
| 2010/0285959 A1 | 11/2010 | Armel et al. |
| 2011/0015066 A1 | 1/2011 | Shroff et al. |
| 2011/0021350 A1 | 1/2011 | Reap |
| 2011/0166023 A1 | 7/2011 | Nettleton-Hammond et al. |
| 2011/0190133 A1 | 8/2011 | Epp et al. |
| 2011/0195840 A1 | 8/2011 | Hills et al. |
| 2011/1090128 | 8/2011 | Ratschinski et al. |
| 2011/0218106 A1 | 9/2011 | Webster et al. |
| 2011/0224077 A1 | 9/2011 | Hacker et al. |
| 2011/0237437 A1 * | 9/2011 | Cheung ............... A01N 43/80 504/243 |
| 2011/0277051 A1 | 11/2011 | Sala et al. |
| 2012/0071320 A1 | 3/2012 | Atkinson et al. |
| 2012/0122688 A1 | 5/2012 | Wu et al. |
| 2012/0190547 A1 | 7/2012 | Liu |
| 2012/0208700 A1 | 8/2012 | Hopkins et al. |
| 2013/0067618 A1 | 3/2013 | Ader et al. |
| 2013/0190179 A1 | 7/2013 | Hain et al. |
| 2013/0217573 A1 | 8/2013 | Koivune et al. |
| 2013/0331267 A1 | 12/2013 | Aulisa |
| 2014/0005051 A1 * | 1/2014 | Beestman ............... A01N 25/30 504/134 |
| 2014/0051578 A1 | 2/2014 | Zawierucha et al. |
| 2014/0100110 A1 | 4/2014 | Kinney et al. |
| 2014/0135219 A1 | 5/2014 | Hain et al. |
| 2014/0208463 A1 | 7/2014 | Deall et al. |
| 2014/0243199 A1 | 8/2014 | Hacker et al. |
| 2015/0089682 A1 | 3/2015 | Ruiter et al. |
| 2015/0148234 A1 | 5/2015 | Sala et al. |
| 2015/0148235 A1 | 5/2015 | Sala et al. |
| 2015/0264933 A1 | 9/2015 | Almsick et al. |
| 2015/0313237 A1 | 11/2015 | Hain et al. |
| 2015/0344445 A1 | 12/2015 | Lohmann et al. |
| 2016/0143279 A1 | 5/2016 | Frihauf et al. |
| 2016/0160232 A1 | 6/2016 | Ruiter et al. |
| 2016/0208277 A1 | 7/2016 | Ruiter et al. |
| 2016/0222404 A1 | 8/2016 | Sala et al. |
| 2016/0222405 A1 | 8/2016 | Sala et al. |
| 2016/0242419 A1 | 8/2016 | Koehn et al. |
| 2016/0278384 A1 | 9/2016 | Jabs et al. |
| 2016/0298129 A1 | 10/2016 | Ruiter et al. |
| 2017/0027174 A1 | 2/2017 | Poree et al. |
| 2017/0042154 A1 | 2/2017 | Major et al. |
| 2017/0042155 A1 | 2/2017 | Walter et al. |
| 2017/0044565 A9 | 2/2017 | Kinney et al. |
| 2017/0050953 A1 | 2/2017 | Selby et al. |
| 2017/0188574 A1 | 7/2017 | Reap |
| 2017/0215418 A1 | 8/2017 | Shinn et al. |
| 2017/0231223 A1 | 8/2017 | Klug et al. |
| 2018/0000069 A1 | 1/2018 | Egan et al. |
| 2018/0027815 A1 | 2/2018 | Barnett et al. |
| 2018/0084778 A1 | 3/2018 | Morris et al. |
| 2018/0092358 A1 | 4/2018 | Morris et al. |
| 2018/0105501 A1 | 4/2018 | Deprez et al. |
| 2018/0116217 A1 | 5/2018 | Mann et al. |
| 2018/0242580 A1 | 8/2018 | Armel et al. |
| 2018/0298454 A1 | 10/2018 | Sala et al. |
| 2018/0368411 A1 | 12/2018 | Kraus et al. |
| 2019/0098899 A1 | 4/2019 | Gewehr et al. |
| 2019/0110468 A1 | 4/2019 | Goldsmith et al. |
| 2019/0110480 A1 | 4/2019 | Siepe et al. |
| 2019/0136254 A1 | 5/2019 | Ruiter et al. |
| 2019/0141993 A1 | 5/2019 | Hemminghaus et al. |
| 2019/0254278 A1 | 8/2019 | Amano et al. |
| 2019/0364888 A1 | 12/2019 | Urch et al. |
| 2019/0373894 A1 | 12/2019 | Urch et al. |
| 2020/0002333 A1 | 1/2020 | Quaranta et al. |
| 2020/0022369 A1 | 1/2020 | Auler et al. |
| 2020/0095602 A1 | 3/2020 | Hain et al. |
| 2020/0236925 A1 | 7/2020 | Essig et al. |

FOREIGN PATENT DOCUMENTS

| | | | |
|---|---|---|---|
| CA | 2408219 A1 | | 1/2003 |
| CA | 2407269 C | | 12/2009 |
| CA | 2677185 C | | 12/2013 |
| CN | 103444752 A | | 12/2013 |
| CN | 103651482 A | * | 3/2014 |
| CN | 103960266 A | | 8/2014 |
| CN | 104094954 A | | 10/2014 |
| CN | 104285994 A | * | 1/2015 |
| CN | 103493838 B | | 4/2015 |
| CN | 104522017 A | | 4/2015 |
| CN | 104738069 A | | 7/2015 |
| CN | 104920362 A | | 9/2015 |
| CN | 104996447 A | | 10/2015 |
| CN | 105941448 A | | 9/2016 |
| CN | 106689170 A | | 5/2017 |
| CN | 105532703 B | | 3/2018 |
| CU | 20070254 A7 | | 6/2009 |
| EP | 0598515 A1 | | 5/1994 |
| EP | 1974609 A1 | | 10/2008 |
| JP | 2000095620 A | * | 4/2000 |
| MX | 2011007310 A | | 8/2011 |
| MX | 2013004784 A | | 6/2013 |
| MX | 2017008727 A | | 10/2017 |
| WO | 0187064 A1 | | 11/2001 |
| WO | 2016102504 A1 | | 6/2016 |
| WO | 2017220680 A1 | | 12/2017 |
| WO | 2019034934 A1 | | 2/2019 |
| WO | 2019052930 A1 | | 3/2019 |
| WO | 2019244088 A1 | | 12/2019 |
| WO | 2020082148 A1 | | 4/2020 |
| WO | 2020172305 A1 | | 8/2020 |

* cited by examiner

| | Effect of Treatment on Yellow Nutsedge (*Cyperus esculentus*) | | | | | | |
|---|---|---|---|---|---|---|---|
| | | | Mean % control of *Cyperus esculentus* post treatment application | | | | |
| Treatment No. | Formulation | Formulation Rate Mg/L or Ml/L | 7 days | 14 days | 22 days | 29 days | 37 days |
| 1 (control) | --none-- | -- | 0% b | 0% b | 0% b | 0% c | 0% d |
| 2 | SedgeHammer® [1] | 114.33 mg/L (0.0623 lb active/acre) | 12% a | 28% a | 68% a | 81% a | 91% ab |
| 3 | SedgeHammer® [1] | 228.66 mg/L (0.0623 lb active/acre) | 12% a | 32% a | 73% a | 87% a | 91% ab |
| 4 | Inventive Composition A | 0.314 ml/L (0.0623 lb active/acre) | 12% a | 28% a | 70% a | 86% a | 90% ab |
| 5 | Inventive Composition A | 0.628 ml/L (0.125 lb active/acre) | 11% a | 31% a | 72% a | 88% a | 92% a |
| 6 | Inventive Composition A [1] | 0.314 ml/L (0.0623 lb active/acre) | 9% a | 32% a | 72% a | 86% a | 91% ab |
| 7 | Inventive Composition A [1] | 0.628 ml/L (0.125 lb active/acre) | 11% a | 32% a | 72% a | 83% a | 93% a |
| 8 | Inventive Composition B | 0.3675 ml/L (0.0623 lb active/acre) | 8% a | 27% a | 68% a | 76% ab | 84% bc |
| 9 | Inventive Composition B | 0.735 ml/L (0.125 lb active/acre) | 13% a | 33% a | 68% a | 84% a | 89% ab |
| 10 | Inventive Composition B [1] | 0.3675 ml/L (0.0623 lb active/acre) | 10% a | 24% a | 63% a | 68% b | 81% c |
| 11 | Inventive Composition B [1] | 0.735 ml/L (0.125 lb active/acre) | 10% a | 25% a | 67% a | 81% a | 88% ab |

[1] Treatment includes the non-ionic adjuvant Latron B-1956 at 0.25% v/v
*Means followed by same letter do not significantly differ (P=.05, Duncan's New MRT)

STABLE LIQUID FORMULATIONS AND METHODS OF USING THE SAME

FIELD

Liquid pesticide compositions having enhanced stability, and methods of using the same are provided.

BACKGROUND

Liquid compositions are desirable since they facilitate easy volumetric measurement and transfer. This advantage can be realized for in-process liquid intermediates or final liquid compositions. Liquid compositions can be single-phase or multi-phase compositions, including emulsions, suspensions, solutions, etc. Common ingredients in liquid compositions contain hydroxy-functionality in the diluents, solvents, surfactants, and/or rheology modifiers, etc. These common ingredients which contain hydroxy-functionality include water, alcohols, glycols, alkoxylated surfactants, etc.

Certain pesticides are known to be chemically unstable. These pesticides exhibit unacceptable loss in stored liquid compositions. A chemically unstable pesticide generally has a greater than 5% (w/w) relative loss of that pesticide after storing the liquid composition for 8 weeks at 40° C. (measured using quantitative chromatography, such as HPLC). Chemically unstable liquid compositions are usually not commercially successful since liquid compositions are typically stored at 40° C. or higher.

The most common composition types for chemically unstable pesticides are solid compositions, such as a water-dispersible powder (WP), water-soluble powder (SP), water-dispersible granule (WG), water-soluble granule (SG), or broadcast-type ready-to-use granule (G). These compositions seek to avoid/minimize liquid-based contact of the pesticide with ingredients commonly used to make liquid compositions, and thereby maximize chemical stability of the pesticide by avoiding liquid compositions. The existence of commercially successful solid compositions for chemically unstable pesticides implies that liquid compositions do not have acceptable storage stability.

U.S. Publication No. 2011/0166023 discloses an herbicidal composition comprising a) at least one ALS-inhibiting herbicide; b) at least one HPPD-inhibiting herbicide; and c) at least one saturated or unsaturated fatty acid. The publication asserts that the use of a saturated or unsaturated fatty acid may chemically stabilize an herbicidal composition comprising at least one sulfonylurea herbicide and at least one HPPD-inhibiting herbicide. However, while the use of certain fatty acids showed improved stability for several HPPD-inhibiting herbicides, almost every sulfonylurea herbicide tested had an unacceptable storage stability (over 5% (w/w) relative loss after storage for 47 days at 40° C.).

A need exists for a stable liquid pesticide (e.g. herbicidal) compositions particularly sulfonylurea herbicides exhibiting less than 5% (w/w) relative loss of the active herbicide upon storage at least 47 days at 40° C.

SUMMARY OF VARIOUS ASPECTS OF THE DISCLOSURE

Liquid pesticide compositions and methods of making and using the same are provided. The liquid pesticide composition comprises a) halosulfuron-methyl; b) one or more diluent(s), where the diluent(s) is a liquid comprising: i) a first carbon structure of at least six carbon atoms optionally including one or more heteroatom(s), the first carbon structure being linear, branched, cyclic or aromatic; ii) optionally one or more glyceryl, carbonyl, phenyl, sulfonyl, or phosphonyl group(s) on the first carbon structure, wherein the organic diluent(s) lack hydroxyl group(s) on the first carbon structure unless they are part of the optional carbonyl, phenyl, sulfonyl, or phosphonyl group(s); c) optionally, one or more surfactant(s), wherein the one or more surfactant(s) comprise: i) a second carbon structure of at least six carbon atoms optionally including one or more heteroatom(s), wherein the second carbon structure is linear, branched, cyclic or aromatic; ii) optionally one or more glyceryl, carbonyl, phenyl, sulfonyl, or phosphonyl group(s) on the second carbon structure, wherein the surfactant(s) lack hydroxyl group(s) on the second carbon structure unless they are part of the optional phenyl, carbonyl, sulfonyl, or phosphonyl group(s); d) optionally, one or more rheology modifier(s); e) optionally, one or more buffering agent(s); wherein the liquid pesticide composition exhibits 5% (w/w) or less loss of halosulfuron-methyl upon storage for 8 weeks at 40° C. measured using quantitative chromatography.

The liquid pesticide composition may include 0.01-40% (w/w) of one or more pesticide(s), 40-95% (w/w) of one or more diluent(s), 0-20% (w/w) of one or more surfactant(s), and 0-10% (w/w) of one or more rheology modifier(s). In another embodiment, the liquid pesticide composition may include 5-30% (w/w) of one or more pesticide(s), 40-90% (w/w) of one or more diluent(s), 5-10% (w/w) of one or more surfactant(s), and 0-5% (w/w) of one or more rheology modifier(s). In another embodiment, the liquid pesticide composition may include 20-30% (w/w) of one or more pesticide(s), 40-82% (w/w) of one or more diluent(s), 5-10% (w/w) of one or more surfactant(s), and 3-8% (w/w) of one or more rheology modifier(s).

In addition to halosulfuron-methyl, the liquid pesticide composition may include one or more chemically stable pesticide(s), including Benzobicyclon, Dicamba, and/or Prosulfuron. In one embodiment, the rheology modifier may comprise silica.

In one embodiment, the surfactant is an acid selected from oleic, caprylic, decanedioic, or linolenic, or a salt thereof. The surfactant may also be a salt of the acid selected from sodium, potassium, lithium, magnesium, calcium, zinc, or aluminum salt, or a mixture of one or more of the foregoing salts and the acid.

In one embodiment, the surfactant comprises at least one glyceryl group. The surfactant may be selected from tri-caprylate glycerol, trioleate glycerol, tristearate glycerol, di-lineolate/monostearate glycerol, or mixtures thereof. The glyceryl may include a salt of carbonyl, sulfonyl, or phosphonyl, in which case any OH groups associated with the carbonyl, sulfonyl, or phosphonyl would not lead to degradation. However, an OH group associated with the glyceryl-moiety itself, such as in the case of a mono- or di-glyceride would lead to instability.

In one embodiment, the surfactant may comprise a sulfonyl group. The surfactant may be selected from mono/di oleyl sulfate, lauryl sulfate, dodecylbenzene sulfonate, oleyl sulfonate, 2-propenoic acid butyl ester polymer with ethenyl acetate and ethyenesulfonate, or a salt thereof. The surfactant may also be a salt of the sulfate or sulfonate selected from sodium, potassium, lithium, magnesium, calcium, zinc, or aluminum salt, or a mixture of one or more of the foregoing salts and the acid form of the sulfate or sulfonate.

In one embodiment, the surfactant may comprise at least one phosphonyl group. The surfactant may be a phosphate or phosphonate selected from mono/di oleyl phosphonate, lauryl phosphonate, dodecylbenzene phosphonate, oleyl phosphonate, 2-propenoic acid butyl ester polymer with ethenyl acetate and ethenephosphonate, and salts thereof. The surfactant may also be a salt of the phosphate or phosphonate selected from sodium, potassium, lithium, magnesium, calcium, zinc, or aluminum salt, or a mixture of one or more of the foregoing salts and the acid form of the phosphate or phosphonate.

In a particular embodiment, the liquid pesticide composition may comprise 0.01-40% (w/w) halosulfuron-methyl; 40-95% (w/w) of one or more diluent(s); 0-20% (w/w) of one or more surfactant(s) wherein the surfactant is selected from sodium oleate, mono-$C_{10-16}$-alkylesters, calcium lignosulfonate, sodium dioctyl sulfosuccinate, potassium phosphate monobasic/potassium phosphate dibasic, phosphate ester, sodium dodecylbenzene sulfonate, acrylic-styrene copolymer salt, or mono tertiary amine-PEG-trimerate, or mixtures thereof; and 0-10% (w/w) rheology modifier.

In a particular embodiment, the liquid pesticide composition may comprise 20-30% (w/w) halosulfuron-methyl; 40-82% (w/w) of one or more diluent(s); 5-10% (w/w) of one or more surfactant(s), wherein the surfactant is selected from sodium oleate, mono-$C_{10-16}$-alkylesters, calcium lignosulfonate, sodium dioctyl sulfosuccinate, potassium phosphate monobasic/potassium phosphate dibasic, phosphate ester, sodium dodecylbenzene sulfonate, acrylic-styrene copolymer salt, or mono tertiary amine-PEG-trimerate, or mixtures thereof; and 3-8% (w/w) of one or more rheology modifier(s).

Methods for controlling pest(s) in a lawn, garden, turf grass, agriculture crops, non-crop areas, or ornamentals are also provided. In one aspect, the method comprises applying any of the liquid pesticide compositions described herein to the lawn, garden, turf grass, agriculture crops, non-crop areas, or ornamentals. In one aspect, the crop field may be selected from field corn, field corn grown for seed, grain sorghum (milo), rice, sugarcane, fallow ground, cotton, or dry beans, or combinations thereof.

In a particular aspect, the liquid pesticide composition comprises halosulfuron-methyl and the pests may include undesired vegetation selected from Alfalfa (*Medicago sativa*); Alligator weed (*Alternanthera philoxeroides*); Amaranth, palmer (*Amaranthus palmeri*); Amaranth, spiny (*Amaranth spinosus*); Artichoke, Jerusalem (*Helianthus tuberosus*); Barnyardgrass (*Echinochloa crusgalli*); Beggarweed, Florida (*Desmodium tortuosurn*); Bindweed (*Calystegia sepium*); Bindweed, field (*Convolvulus arvensis*); Bindweed, hedge (*Calystegia sepium*); Buckwheat, wild; *Polygonum convolvulus*); Buffalobur (*Solanum rostratum*); Burcucumber (*Sicyos angulatus*); Buttercup, hairy (*Ranunculus sardous*); California arrowhead (*Sagittaria montevidensis*); Carpetweed (*Mollugo verticillata*); Chamomile, mayweed (*Anthemis cotula*); Chervil, bur (*Anthriscus scandicina*); Chickweed, common (*Stellaria media*); Chickweed, mouse ear (*Cerastium vulgatum*); Clover, white (Dutch) (*Trifolium repens*); Cocklebur, common (*Xanthium strumarium*); Copperleaf, hophornbeam (*Acalypha ostryifolia*); Corn Spurry (*Spergula arvensis*); Cutleaf groundcherry (*Physalis angulata*); Dandelion, common (*Taraxacum officinale*); Dayflower (*Commelina erecta*); Dayflower, spreading (*Commelina diffusa*); Deadnettle, purple (*Lamium purpureum*); Devils Claw (*Proboscidea louisianica*); Dogbane, hemp (*Apocynum cannabinum*); Ducks alad (*Heteranthera limosa*); Early Water grass (*Echinochloa oryzoides*); Eclipta (*Ecilpta prostrata*); Eveningprimrose, cutleaf (*Oenothera laciniata*); Fiddleneck, coast (*Amsinckia intermedia*); Fleabane, Philadelphia (*Erigeron philadelphicus*); Flixweed (*Descurainia Sophia*); Galinsoga(*Galinsoga* spp.); Galinsoga(*Galinsoga*); Galinsoga, hairy (*Galinsoga quadriradiata*); Garlic, wild (*Allium vineale*); Golden crownbeard (*Verbesina encelioides*); Goose foot (*Chenopodium californicum*); Gromwell, corn (*Lithospermum arvense*); Groundsel, common (*Senecio vulgaris*); Henbit (*Lamium amplexicaule*); Horsenettle (*Solanum carolinense*); Horsetail (*Equisetum arvense*); Horseweed (Marestail) (*Conyza canadensis*); Horseweed/Marestail (*Erigeron canadensis*); Jimsonweed (*Datura stramonium*); Jointvetch (*Aeschynomene virginica*); Knotweed, prostrate (*Polygonum aviculare*); Kochia(*Kochia scoparia*); Kyllinga, Annual (*Kyllinga sesquiflorus*); Kyllinga, Green (*Kyllinga breviflora*); Ladysthumb (*Polygonum persicaria*); Lambsquarter, common (*Chenopodium album*); Late Watergrass/Rice Mimic (*Echinochloa phyllopogon*); Lettuce, miners (*Claytonia perfoliata*); Lettuce, prickly (*Lactuca serriola*); Mallow, common (*Malva neglecta*); Mallow, Venice (*Hibiscus trionum*); Mayweed chamomile (dog fennel) (*Anthemis cotula*); Milkweed, common (*Asclepias syriaca*); Milkweed, honeyvine (*Ampelamus albidus*); Monochoria(*Monochoria* spp); Morningglory, ivyleaf (*Ipomoea hederacea*); Morningglory, pitted (*Ipomoea lacunosa*); Morningglory, smallflower (*Jacquemontia tamnifolia*); Morningglory, tall & Ivyleaf (*Ipomoea* spp.); Morningglory, tall (*Ipomoea purpurea*); Mustard, blue (*Chorispora tenella*); Mustard, tumble (*Sisymbrium altissimum*); Mustard, wild (*Sinapis arevensis*); Nightshade, black (*Solanum* spp.); Nutsedge, Purple (*Cyperus rotundus*); Nutsedge, Yellow (*Cyperus esculentus*); Passionflower, maypop (*Passiflora incarnata*); Pennycress, field (*Thlaspi arvense*); Pepperweed, field (*Lepidium campestre*); Pepperweed, Virginia (*Lepidium virginicum*); Pigweed, redroot (*Amarunthus retrofiexus*); Pigweed, smooth (*Amaranthus hybridus*); Pigweed, tumbl (*Amaranthus hybridus*); Pineappleweed (*Matricaria discoidea*); Plantain (*Plantago major*); Pokeweed, common (*Phytolacca Americana*); Puncturevine (*Tibulus terrestris*); Purslane (*Portulaca oleracea*); Purslane, common (*Portulaca oleracea*); Purslane, horse (*Trianthema portulacastrum*); Pursley, Florida (*Richardia scabra*); Radish, wild (*Raphanus raphanistrum*); Ragweed, common (*Ambrosia artemisiifolia*); Ragweed, giant (*Ambrosia trifida*); Redstem (*Ammania auriculata*); Ricefield bulrush (*Scirpus mucronatus*); Sesbania, hemp (*Sesbania exaltata*); Sharppoint fluvellin*, (*Kickxia elatine*); Shepherd's purse (*Capsella bursa pastoris*); Sicklepod (*Cassia obtusifolia*); Sida, prickly (*Sida spinosa*); Smallflower umbrella sedge (*Cyperus difformis*); Smartweed, Annual (*Polygonum* spp.); Smartweed, Pennsylvania (*Polyfonum pennsylvanicum*); Sowthistle, annual (*Sonchus oleraceus*); Sprangletop (*Leptochloa fascicularis*); Sun flower (*Helianthus annuus*); Sun flower (*Helianthus* spp.); Tansymustard (*Descurainia pinnata*); Texasweed (*Caperonia palustris*); Thistle, Canada (*Cirsium arvense*); Thistle, Russian (*Salsola iberica*); Velvetleaf (*Abutilan theophrasti*); Wallflower, bushy (*Erysimum repandum*); Water hyssop (*Bacopa.* spp); Waterhemp, common (*Amaranthus rudis*); Waterhemp, tall2 (*Amaranthus tuberculatus*); Waterhemp (*Amaranthus* spp); Willow herb, common (*Epilobium ciliatum*); Willowherb (*Epilobium ciliatum*); Yellowcress, creeping (*Rorippa sylvestris*), or combinations thereof.

BRIEF DESCRIPTION OF THE FIGURES

FIG. 1 shows trial data of two inventive compositions and a commercial herbicide for control of Yellow Nutsedge (*Cyperus esculentus*).

DETAILED DESCRIPTION OF VARIOUS ASPECTS OF THE DISCLOSURE

The present inventors have found that halosulfuron-methyl, may be made more stable in liquid compositions by formulating those pesticides with particular diluents and/or surfactants. The liquid compositions generally comprise halosulfuron-methyl and at least one diluent, and optionally at least one surfactant and/or rheology modifier. The diluent, surfactant, and rheology modifier are generally inert ingredients. The inventors have found, however, that the presence of certain types of hydroxyl groups on these components leads to unstable compositions. The compositions described herein lose less than 5% (w/w) of halosulfuron-methyl after storing the liquid composition for 8 weeks at 40° C. in a sealed container. The compositions may be applied to any desired environment, such as a lawn, garden, turf grass, agriculture crops, non-crop areas, or ornamentals.

The presence of certain hydroxyl groups leads to instability of halosulfuron-methyl pesticide compositions. However, this instability does not result from the presence of OH components that are acidic due to adjacent electron withdrawing groups (e.g., carbonyl, sulfonyl, phosphonyl), or groups where negative charge is spread over a large volume of the group (e.g., phenyl). Rather, particular OH groups having a pKa above 13 have been found to lead to instability when present in a halosulfuron-methyl composition. In the case of surfactants, where the OH group resembles ethanol (pKa=16), as in an OH found on a hydrocarbon chain or at any position on a fatty acid except the carbonyl group, the inventors have found instability. Thus, stability may be predicted by the lack of OH groups on a surfactant compound having an estimated pKa (from tables) of greater than 13.

As used herein, the pKa may be estimated by looking to standard charts showing estimated pKa values for specific OH groups, such as the following table:

TABLE 1

| Group | Estimated pKa |
| --- | --- |
| Sulfuric | Strong Acid |
| Carboxylic | 4 |
| Phosphoric | 2.2, 7.2, 12.4 |
| Phenol | 10 |
| Glycerol | 14.4 |
| Alkanol | 15-18 |

The following surfactant compounds include the type of alcohol or hydroxyl group that the inventors have found leads to instability of halosulfuron-methyl pesticide compositions:

TABLE 2

Compounds Leading to Instability

| Compound Name | Formula |
| --- | --- |
| Ricinoleic Acid |  |
| 3-Hydroxyoctadecanoic acid |  |
| Polyglycerol-10 distearate |  |

TABLE 2-continued

Compounds Leading to Instability

| Compound Name | Formula |
|---|---|
| Alcohol ethoxylate | $CH_3-[CH_2]_y-[OCH_2CH_2]_x-OH$ |
| Nonylphenol Ethoxylate | $C_9H_{19}-C_6H_4-[O-CH_2CH_2]_n-OH$ |
| Poly(oxy-1,2-ethanediyl), α-[3-[1,3,3,3-tetramethyl1-[(trimethylsilyl)oxy]-1-disiloxanyl]propyl]-ω-hydroxyl | (trisiloxane structure with $-O-[CH_2-CH_2-O]_y-OH$) |
| Tristyrylphenol ethoxylate | (tristyrylphenol with $-[O]_n-OH$ chain) |

Each of the compounds above includes a hydroxyl group present on a carbon chain suggesting a pKa comparable to that of ethanol. The inventors have observed that such compounds, whether used as a surfactant on their own, or present as an impurity or other component in a surfactant or other component of the composition, leads to instability of a halosulfuron-methyl composition containing such compound or compounds.

The following table shows seven compositions where the amount of halosulfuron-methyl lost was greater than 5% of the pesticide after storing the liquid composition for 8 weeks at 40° C. in a sealed container.

TABLE 3

Unstable Halosulfuron-Methyl Compositions

| | | Diluent (liquid) | | Surfactant | | | |
|---|---|---|---|---|---|---|---|
| | Halosulfuron-methyl (purity 99%) | RADIA 7118 (>95% Methyl Laurate) | Stepan 108 (>90% caprylic/capric triglyceride) | Caprol PGE 860 (1,2,3-Propanetriol, homopolymer, (9Z)-9-octadecenoate) | PEG 8000 (Polyethylene glycol) | Polyaldo 3-1-S (Polyglyceryl-3 stearate) | Silwet L-77 (siloxane polyalkyleneoxide copolymer, >50% methyl-terminated) |
| 1 | 13.6 | | | | | 86.4 | |
| 2 | 12.5 | | | | 87.5 | | |
| 3 | 15.0 | | | 85.0 | | | |
| 4 | 5.0 | | 90.0 | | | | 5.0 |
| 5 | 5.0 | | 90.0 | | | | |
| 6* | 20.0 | 69.0 | | | | | |
| 7 | 20.0 | 69.0 | | | | | |

TABLE 3-continued

Unstable Halosulfuron-Methyl Compositions

| | Surfactant | | | | | |
|---|---|---|---|---|---|---|
| | SOPROPHOR ® TSP 724 (alkoxylated polyaryl phenol, >99%) | STEPFAC 8181 | Hypermer B210 (ABA block copolymer) | Altox Metasperse 550 S-PW(WD) | Cirrasol G 1086 NV-LQ-AP (polyoxyethylene (40) sorbitol hexaoleate) | RM Hi-Sil T600 (silica, amorphous) |
| 1 | | | | | | |
| 2 | | | | | | |
| 3 | | | | | | |
| 4 | | | | | | |
| 5 | 5.0 | | | | | |
| 6* | | 5.0 | 2.0 | | | 4.0 |
| 7 | | | | 2.0 | 5.0 | 4.0 |

*This composition was not tested for the full eight weeks due to physical instability.
"RM" stands for rheology modifier.

To test stability, the compositions were sealed in a container and stored for 8 weeks at 40° C. The relative percentage loss of halosulfuron-methyl was calculated using high performance liquid chromatography (HPLC). The samples were extracted with solvents and then analyzed with reverse phase HPLC equipped with UV detector. The response from the detector are peak areas (mAu*s). The peak areas were correlated with percentage active ingredients through a standard calibration curve. The percentage of pesticide was calculated through the calibration curve. Chemically stable compositions are those compositions that had less than 5% (w/w) relative loss of halosulfuron-methyl after 8 weeks of storage at 40° C.

The seven compositions (described above) that failed can be described as follows: (1) contains unacceptable alcoholic-hydroxy; (2) contains unacceptable hydroxy-termination from polyethylene glycol synthesis; (3) contains unacceptable alcoholic-hydroxy; (4) contains CAS #67674-67-3 (Silwet L-77) with unacceptable hydroxy functionality; (5) contains unacceptable hydroxy-termination of the alkoxylate; (6) contains unacceptable hydroxy-termination from polyethylene glycol synthesis; and (7) contains unacceptable hydroxy-termination from polyethylene glycol synthesis. The inventive compositions described herein lack such alcohols in any of the components, particularly the surfactant where such alcohols are a common feature or are present as a result of the manufacturing process, or incomplete purification. These alcohol-containing compounds need to be removed or avoided in order to achieve a stable halosulfuron-methyl composition.

The present inventors have found that molecules having instability-producing OH groups even if present in small quantities can render the entire composition unstable. For example, the composition Silwet L-77 (siloxane polyalkyleneoxide copolymer, >50% methyl-terminated) leads to instability. In theory, methyl-terminated siloxanes should not have instability producing OH groups. However, the inventors have found that methyl-terminated siloxanes contain some OH-terminated siloxane molecules. Even if present in small amounts, the OH-terminated siloxanes result in instability of the overall composition.

The instability producing OH groups lead to instability regardless of whether they are a minor component in a much larger molecule. For example, the inventors have observed instability for polyethylene glycol 8000 (PEG8000) even though the entire 8000 MW polymer has only a single instability producing OH group. In addition, PEG and polypropylene glycol (PPG) are known impurities in many compounds such as fatty alcohol ethoxylates (FAEs). See Lee et al., "Quantification of Poly (Ethylene Glycol) and Poly (Propylene Glycol) in Alkoxylated Surfactants." Accordingly, it is important to ensure that these OH groups are not present as part of an impurity molecule.

The liquid compositions of the present invention which are described herein comprise halosulfuron-methyl (CAS 100784-20-1) either alone or in combination with another pesticide, such as a combination of halosulfuron-methyl and Benzobicyclon (CAS 156963-66-5). Other pesticides may be used in combination with halosulfuron-methyl, such as for example Prosulfuron (CAS 94125-34-5) or Dicamba (CAS 1918-00-9). The halosulfuron-methyl comprises at least 0.01%, 3%, 5%, 10%, 15%, 20%, 25%, 30%, or 40% (w/w) by weight of the total weight of the composition. In other aspects, the chemically unstable pesticide is less than 40%, 35%, 30%, 25%, 20%, 15%, or 10% (w/w) of by weight of the total weight of the composition.

The liquid compositions described herein comprise one or more diluents. The diluent is a liquid contributing toward dissolving or suspending the halosulfuron-methyl active ingredient into an overall liquid herbicidal composition. The diluent may optionally have a functional group providing surfactant properties, or other desired properties. Alternatively, the diluent may simply be a liquid capable of dissolving or carrying the halosulfuron-methyl. As with other components of the invention, the diluent must lack hydroxyl groups except those associated with an electron withdrawing or electron dense functional group such as a carbonyl, sulfonyl, phosphonyl or phenyl group. The diluent therefore may comprise at least one of alkyl carboxylic acids, alkyl carboxylate salts, alkenyl carboxylic acids, alkenyl carboxylate salts, aryl carboxylic acids, aryl carboxylate salts, alkyl sulfuric acids, alkyl sulfate salts, alkenyl sulfuric acids, alkenyl sulfate salts, aryl sulfuric acids, aryl sulfate salts, alkyl sulfonic acids, alkyl sulfonate salts, alkenyl sulfonic acids, alkenyl sulfonate salts, aryl sulfonic acids, aryl sulfonate salts, alkyl phosphate ester with free acids, alkyl phosphate ester with salts, alkenyl phosphate ester with free acids, alkenyl phosphate ester with salts, aryl phosphate ester with free acids, aryl phosphate ester with salts, alkyl phosphonate ester with free acids, alkyl phosphonate ester with salts, alkenyl phosphonate ester with free acids, alkenyl phosphonate ester with salts, aryl phosphonate ester with free acids, aryl phosphonate ester with salts, or a mixture thereof. In particular aspects, the diluent is oleic acid, oleic salt, sodium oleate, lauryl sulfate, sodium lauryl sulfate, lignosulfonate acid, lignosulfonate salt, calcium lignosulfonate, dioctyl sulfosuccinate sodium salt in methyl oleate, sodium dioctyl sulfosuccinate, phosphate ester, ethoxylated phosphate ester, methyl ester, triglyceride, or a mixture thereof. The diluent comprises at least 35%, 45%, 50%, 55%, 60%, 65%, 70%, 75%, 80%, 85%, 90%, 95%, or 97% (w/w) by weight of the total weight of the composition.

The liquid compositions described herein may include one or more surfactants. The surfactant may be as described above both a diluent and a surfactant. In that case, the surfactant must be a liquid. Alternatively, the surfactant may be a solid surfactant that can be added to the liquid diluent. In general, a surfactant will have a non-polar and polar (often ionic) group. The surfactant allows the overall composition to be more readily dispersed in water at the point of use. As with other components of the invention, the surfactant must lack hydroxyl groups except those associated with an electron withdrawing functional group such as a carbonyl, sulfonyl, phosphonyl or phenyl group. In other aspects, the surfactant comprises at least one of alkyl carboxylic acids, alkyl carboxylate salts, alkenyl carboxylic acids, alkenyl carboxylate salts, aryl carboxylic acids, aryl carboxylate salts, alkyl sulfuric acids, alkyl sulfate salts, alkenyl sulfuric acids, alkenyl sulfate salts, aryl sulfuric acids, aryl sulfate salts, alkyl sulfonic acids, alkyl sulfonate salts, alkenyl sulfonic acids, alkenyl sulfonate salts, aryl sulfonic acids, aryl sulfonate salts, alkyl phosphate ester with free acids, alkyl phosphate ester with salts, alkenyl phosphate ester with free acids, alkenyl phosphate ester with salts, aryl phosphate ester with free acids, aryl phosphate ester with salts, alkyl phosphonate ester with free acids, alkyl phosphonate ester with salts, alkenyl phosphonate ester with free acids, alkenyl phosphonate ester with salts, aryl phosphonate ester with free acids, aryl phosphonate ester with salts, or a mixture thereof. In particular aspects, the surfactant is oleic acid, oleic salt, sodium oleate, lauryl sulfate, sodium lauryl sulfate, lignosulfonate acid, lignosulfonate salt, calcium lignosulfonate, dioctyl sulfosuccinate sodium salt in methyl oleate, sodium dioctyl sulfosuccinate, phosphate ester, ethoxylated phosphate ester, mono tertiary amine-PEG-trimerate, or a mixture thereof. The surfactant comprises at least 1%, 2%, 3%, 4%, 5%, or 10% (w/w) by weight of the total weight of the composition. In other aspects, the surfactant is less than 20%, 15%, 10%, or 5% (w/w) by weight of the total weight of the composition.

In any of the inert ingredients described herein (e.g., diluent, surfactant) where the ingredient is a salt, the cation may be sodium, potassium, lithium, magnesium, calcium, zinc and/or aluminum. In one aspect, the compositions described herein may comprise at least one inorganic or $C_1$-$C_{12}$ organic lithium salt has a molecular weight of 250 or less. In other aspects, the compositions described herein may comprise lithium acetate, lithium carbonate, lithium formate, lithium sulfate, lithium citrate, lithium octanoate, lithium salicylate, lithium benzoate and/or lithium chloride. Alternatively, the compositions described herein do not comprise lithium salts, such as lithium acetate, lithium carbonate, lithium formate, lithium sulfate, lithium citrate, lithium octanoate, lithium salicylate, lithium benzoate and/or lithium chloride.

The liquid compositions described herein may include one or more rheology modifiers. In one aspect, the rheology modifier according to the present invention lack hydroxyl groups having a pKa above 13, tested in water at 25° C. In particular aspects, the rheology modifier is silica, silicate, or precipitated silica. The rheology modifier comprises at least 1%, 2%, 3%, 4%, 5%, or 10% (w/w) by weight of the total weight of the composition. In other aspects, the rheology modifier is less than 20%, 15%, 10%, or 5% (w/w) by weight of the total weight of the composition.

Methods of making the compositions described herein are provided. The methods generally comprise mixing the pesticide with at least one or more inert ingredients (e.g., diluent, surfactant, and/or rheology modifier). For single-phase liquid compositions, the ingredients are blended to ensure complete solubilization. For multi-phase liquid compositions, sufficient energy is applied, to the ingredients or liquid composition or both, to achieve an average size of droplet or particle size of less than 50 microns, or more preferably less than 20 microns, or most preferably less than 10 microns. The final liquid composition is achieved by mixing until homogeneous.

The pesticide compositions of the present invention are either (1) not diluted at the point of use (ready-to-use composition), or (2) diluted at the point of use and used immediately (concentrate composition). The typical water dilution amounts prior to use range from 50:1 to 500:1. Halosulfuron-methyl is particularly susceptible to degradation in water, and cannot be stored for any significant period of time.

The pesticide compositions of the invention could be an intermediate or a manufacture use product, used to formulate other pesticide compositions.

Methods of using the compositions described herein are provided. For example, the compositions described herein may be applied (e.g., via spraying, broadcast) to an area in need of the pesticide, such as a lawn, garden, turf grass, agriculture crops (e.g., corn, rice), non-crop areas, or ornamentals. For example, the compositions (e.g., comprising halosulfuron-methyl) may be applied pre-emergence or post-emergence to control undesirable vegetation, such as Alfalfa (*Medicago sativa*); Alligator weed (*Alternanthera philoxeroides*); Amaranth, palmer (*Amaranthus palmeri*); Amaranth, spiny (*Amaranth spinosus*); Artichoke, Jerusalem (*Helianthus tuberosus*); Barnyardgrass (*Echinochloa crusgalli*); Beggarweed, Florida (*Desmodium tortuosum*); Bindweed (*Calystegia sepium*); Bindweed, field (*Convolvulus arvensis*); Bindweed, hedge (*Calystegia sepium*); Buckwheat, wild; *Polygonum convolvulus*); Buffalobur (*Solanum rostratum*); Burcucumber (*Sicyos angulatus*); Buttercup, hairy (*Ranunculus sardous*); California arrowhead (*Sagittaria montevidensis*); Carpetweed (*Mollugo verticillata*); Chamomile, mayweed (*Anthemis cotula*); Chervil, bur (*Anthriscus scandicina*); Chickweed, common (*Stellaria media*); Chickweed, mouse ear (*Cerastium vulgatum*); Clover, white (Dutch)(*Trifolium repens*); Cocklebur, common (*Xanthium strumarium*); Copperleaf, hophornbeam (*Acalypha ostryifolia*); Corn Spurry (*Spergula arvensis*); Cutleaf groundcherry (*Physalis angulata*); Dandelion, common (*Taraxacum officinale*); Dayflower (*Commelina erecta*); Dayflower, spreading (*Commelina diffusa*); Deadnettle, purple (*Lamium purpureum*); Devils Claw (*Proboscidea louisianica*); Dogbane, hemp (*Apocynum cannabinum*); Ducks alad (*Heteranthera limosa*); Early Water grass (*Echinochloa oryzoides*); Eclipta (*Ecilpta prostrata*); Eveningprimrose, cutleaf (*Oenothera laciniata*); Fiddleneck, coast (*Amsinckia intermedia*); Fleabane, Philadelphia (*Erigeron philadelphicus*); Flixweed (*Descurainia Sophia*); Galinsoga(*Galinsoga* spp.); Galinsoga (*Galinsoga*); Galinsoga, hairy (*Galinsoga quadriradiata*); Garlic, wild (*Allium vineale*); Golden crownbeard (*Verbesina encelioides*); Goose foot (*Chenopodium californicum*); Gromwell, corn (*Lithospermum arvense*); Groundsel, common (*Senecio vulgaris*); Henbit (*Lamium amplexicaule*); Horsenettle (*Solanum carolinense*); Horsetail (*Equisetum arvense*); Horseweed (Marestail) (*Conyza canadensis*); Horseweed/Marestail (*Erigeron canadensis*); Jimsonweed (*Datura stramonium*); Jointvetch (*Aeschynomene virginica*); Knotweed, prostrate (*Polygonum aviculare*); *Kochia*(*Kochia scoparia*); *Kyllinga*, Annual (*Kyllinga sesquiflorus*); *Kyllinga*, Green (*Kyllinga breviflora*); Ladysthumb (*Polygonum persicaria*); Lambsquarter, common (*Chenopodium album*); Late Watergrass/Rice Mimic (*Echinochloa phyllopogon*); Lettuce, miners (*Claytonia perfoliata*); Lettuce, prickly (*Lactuca serriola*); Mallow, common (*Malva neglecta*); Mallow, Venice (*Hibiscus trionum*); Mayweed chamomile (dog fennel) (*Anthemis cotula*); Milkweed, common (*Asclepias syriaca*); Milkweed, honeyvine (*Ampelamus albidus*); *Monochoria*(*Monochoria* spp); Morningglory, ivyleaf (*Ipomoea hederacea*); Morningglory, pitted (*Ipomoea lacunosa*); Morningglory, smallflower (*Jacquemontia tamnifolia*); Morningglory, tall & Ivyleaf (*Ipomoea* spp.); Morningglory, tall (*Ipomoea purpurea*); Mustard, blue (*Chorispora tenella*); Mustard, tumble (*Sisymbrium altissimum*); Mustard, wild (*Sinapis arevensis*); Nightshade, black (*Solanum* spp.); Nutsedge, Purple (*Cyperus rotundus*); Nutsedge, Yellow (*Cyperus esculentus*); Passionflower, maypop (*Passiflora incarnata*); Pennycress, field (*Thlaspi arvense*); Pepperweed, field (*Lepidium campestre*); Pepperweed, Virginia (*Lepidium virginicum*); Pigweed, redroot (*Amarunthus retrofiexus*); Pigweed, smooth (*Amaranthus hybridus*); Pigweed, tumbl (*Amaranthus hybridus*); Pineappleweed (*Matricaria discoidea*); Plantain (*Plantago major*); Pokeweed, common (*Phytolacca Americana*); Puncturevine (*Tibulus terrestris*); Purslane (*Portulaca oleracea*); Purslane, common (*Portulaca oleracea*); Purslane, horse (*Trianthema portulacastrum*); Pursley, Florida (*Richardia scabra*); Radish, wild (*Raphanus raphanistrum*); Ragweed, common (*Ambrosia artemisiifolia*); Ragweed, giant (*Ambrosia trifida*); Redstem (*Ammania auriculata*); Ricefield bulrush (*Scirpus mucronatus*); Sesbania, hemp (*Sesbania exaltata*); Sharppoint fluvellin*, (*Kickxia elatine*); Shepherd's purse (*Capsella bursa pastoris*); Sicklepod (*Cassia obtusifolia*); Sida, prickly (*Sida spinosa*); Smallflower umbrella sedge (*Cyperus difformis*); Smartweed, Annual (*Polygonum* spp.); Smartweed, Pennsylvania (*Polyfonum pennsylvanicum*); Sowthistle, annual (*Sonchus oleraceus*); Sprangletop (*Leptochloa fascicularis*); Sunflower (*Helianthus annuus*); Sun flower (*Helianthus* spp.); Tansymustard (*Descurainia pinnata*); Texasweed (*Caperonia palustris*); Thistle, Canada (*Cirsium arvense*); Thistle, Russian (*Salsola iberica*); Velvetleaf (*Abutilan theophrasti*); Wallflower, bushy (*Erysimum repandum*); Water hyssop (*Bacopa.* spp); Waterhemp, common (*Amaranthus rudis*); Waterhemp, tall (*Amaranthus tuberculatus*); Waterhemp (*Amaranthus* spp); Willow herb, common (*Epilobium ciliatum*); Willowherb (*Epilobium ciliatum*); and/or Yellowcress, creeping (*Rorippa sylvestris*), or combinations thereof.

Various aspects of the disclosure will now be particularly described by way of examples. The following descriptions of specific aspects are presented for purposes of illustration and description, and are not intended to be exhaustive of or to limit the disclosure to the precise compositions disclosed.

Examples 1-17

The compositions described herein lose 5% (w/w) or less of the pesticide after storing the liquid composition for 8 weeks at 40° C. in a sealed container. Alternatively, the compositions described herein comprise at least 95% (w/w) of the pesticide after storing the liquid composition for 8 weeks at 40° C. in a sealed container. The percent loss is measured by quantitative chromatography, such as High Performance Liquid Chromatography (HPLC).

The tradenames used in the following table describe particular products on the market at the time of filing this application. The following descriptions describe the content of these commercial compositions.

RADIA 7118 is 100% methyl laurate (CAS 111-82-0).

STEPOSOL C-48 is methyl laurate 55%, or Stepan C-48.

EMERSOL 213 is oleic acid, crude and single distilled. The components include oleic acid 73%, $C_{14-17}$ fatty acid; 9%, linoleic acid 8%, palmitoleic acid 6%, myristoleic acid 3%, linolenic acid 1%, 2,6-Di-tert-butyl-4-methylphenol 0.01-0.02%

Radia 7060 is 100% methyl oleate, $C_{16-18}$ and $C_{18}$ unsaturated methyl esters.

Stepan 108 is caprylic/capric triglycerides (mixed decanoate and octanoate), 90-100% purity.

Stepanol ME-DRY is sulfuric acid, mono-$C_{10-16}$-alkylesters, sodium salts (90-100%).

Borresperse CA, calcium lignosulfonate (≥92%).

Stepwet 60 OE is sodium dioctyl sulfosuccinate (DOSS) (55-65%), methyl oleate (35-45%).

KPhosphate MB/DB is abbreviation for Potassium Phosphate Monobasic+Potassium Phosphate Dibasic. As noted by the asterisk in the table, this component is a buffering agent, not a surfactant.

STEPFAC 8181 is a phosphate ester, n=6 of the formula:

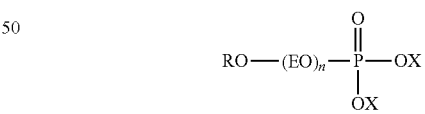

Polyethylene glycol monotridecyl ether phosphate (90-100%); phosphoric acid (1-<3%); and other compounds below reportable levels (1-<3%).

Nanocol 90G is sodium dodecylbenzene sulfonate. The components are Sodium ($C_{10-16}$) benzenesulfonate 90-93%; Sodium sulfate 5%; Sodium chloride<1%; Other components below reportable levels (1-<3%).

Atlox Metasperse 550-5-PW(WD) is acrylic-styrene copolymer salt.

Mono Tertiary Amine-PEG-trimerate.

Hi-Sil T600 is silica, amorphous, precipitated and gel.

TABLE 4

Stable Halosulfuron-Methyl Compositions

| | Active | | Diluent (liquid) | | | | Surfactant/Buffering Agent | |
|---|---|---|---|---|---|---|---|---|
| | Benzobicyclon | Halosulfuron-methyl | RADIA 7118 or Steposol C-48 | Emersol 213 | RADIA 7060 | Stepan 108 | Sodium Oleate | Stepanol ME-DRY |
| 1 | | 5 | | 95 | | | | |
| 2 | | 5 | | 76 | | | 19 | |
| 3 | | 5 | | 90 | | | | 5 |
| 4 | | 5 | | 90 | | | | |
| 5 | | 5 | | 90 | | | | |
| 6 | | 5 | | 90 | | | | |
| 7 | | 5 | | 92 | | | | |
| 8 | | 19 | | 73 | | | | |
| 9 | | 30 | | 56 | | | | |
| 10 | | 15 | | | | 85 | | |
| 11 | | 5 | | | 5 | 90 | | |
| 12 | | 5 | | | | 90 | | |
| 13 | | 20 | 69 | | | | | |
| 14 | | 30 | 58 | | | | | |
| 15 | 25.5 | 5 | | 60.5 | | | | |
| 16 | | 20 | | 34 | 34 | | | |
| 17 | 30.4 | 6.1 | 51 | | | | | |

| | Surfactant/Buffering Agent | | | | | | |
|---|---|---|---|---|---|---|---|
| | Borresperse CA | Stepwet 60 OE | KPhosphate MB/DB* | STEPFAC 8181 | Nanocol 90G | Atlox Metasperse 550-5-PW(WD) | Mono Tertiary Amine PEG trimerate | RM Hi-Sil T600 |
| 1 | | | | | | | | |
| 2 | | | | | | | | |
| 3 | | | | | | | | |
| 4 | 5 | | | | | | | |
| 5 | | | | 5 | | | | |
| 6 | | 5 | | | | | | |
| 7 | | | | | | | | 3 |
| 8 | | | | 5 | | | | 3 |
| 9 | | | | 5 | | 3 | | 6 |
| 10 | | | | | | | | |
| 11 | | | | | | | | |
| 12 | | | 5 | | | | | |
| 13 | | | | 5 | | 2 | | 4 |
| 14 | | | | | 4 | 3 | | 5 |
| 15 | | | | 5 | | | | 4 |
| 16 | | | | 5 | | | 2 | 5 |
| 17 | | | | | 7 | 2.5 | | 3 |

"RM" stands for rheology modifier

Example 18

The inventors sought to determine whether two sulfonylurea pesticides, thifensulfuron-methyl and halosulfuron-methyl, exhibit the same or different stability when formulated with the same inert ingredients.

As shown in Table 3 (Unstable Halosulfuron-Methyl Compositions), Composition #7, halosulfuron-methyl was unstable. This composition was prepared again, except halosulfuron-methyl was replaced with thifensulfuron-methyl 98% as shown in Table 5:

TABLE 5

| Ingredient | Weight |
|---|---|
| Halosulfuron-methyl, 99% | 20.0 |
| Diluent | 69.0 |
| Surfactants | 7.0 |
| Rheology Modifier | 4.0 |
| Total | 100% |

The diluent(s), surfactant(s), and rheology modifier(s) were added to a suitable container and mixed. During mixing, thifensulfuron-methyl technical powder was slowly added, achieving a slightly viscous, opaque, off-white liquid. This composition was aged for 8 weeks at 40° C. Thifensulfuron-methyl was found to be stable in this composition (i.e., less than 5% w/w relative loss), contrary to the result with halosulfuron-methyl (Composition #7, Table 3).

Example 19

A study was conducted to evaluate the comparative efficacy of commercial SedgeHammer® (a solid composition of halosulfuron-methyl) and two liquid compositions corresponding to embodiments of the invention using components described in Table 4, for control of *Cyperus esculentus*, commonly referred to as "yellow nutsedge." The inventive compositions tested are shown in Tables 6 and 7 below:

TABLE 6

Inventive Composition A

| Ingredient | Weight |
| --- | --- |
| Halosulfuron-methyl Technical | 27 |
| Diluent | 60 |
| Surfactants | 10 |
| Rheology Modifier | 3 |
| Total | 100% |

TABLE 7

Inventive Composition B

| Ingredient | Weight |
| --- | --- |
| Halosulfuron-methyl Technical | 22 |
| Diluent | 66 |
| Surfactants | 7 |
| Rheology Modifier | 5 |
| Total | 100% |

These two compositions used components shown in Table 4, and meet the criteria for stable compositions described herein.

The diluent(s), surfactant(s), and rheology modifier(s) were added to a suitable container and mixed. During mixing, halosulfuron-methyl technical powder was slowly added, achieving a slightly viscous, opaque, off-white liquid.

The testing was performed in California, USA at a controlled facility utilizing 2 ft² microplots of established bermudagrass (Cyperus esculentus, var. TIF 419) sod. Five Cyperus esculentus nutlets were transplanted into each of six microplots, representing six replications of each treatment. The yellow nutsedge were allowed to mature to a stage consisting of three to six leaves prior to application of the chemical treatment. The components of each of the chemical treatments were formed as tank mixes in water, and applied as a foliar application to the microplots utilizing a backpack mounted hand held sprayer, pressurized with $CO_2$.

As shown in FIG. 1, similar efficacy was observed for the inventive liquid compositions A and B, and the commercially available solid halosulfuron-methyl composition, SedgeHammer®.

Other embodiments and uses of the compositions described herein will be apparent to those skilled in the art from consideration of the specification and methods disclosed herein. All references cited herein, including all U.S. and foreign patents and patent applications, are specifically and entirely hereby incorporated herein by reference. It is intended that the specification and examples be considered exemplary only.

What is claimed is:

1. A liquid pesticide formulation comprising:
 a) halosulfuron-methyl;
 b) one or more diluent(s), where the diluent(s) is a liquid comprising:
  i) a first carbon structure of at least six carbon atoms, the first carbon structure being a substituted or unsubstituted, saturated or unsaturated, linear or branched alkyl or heteroalkyl;
  ii) optionally one or more glyceryl, carbonyl, phenyl, sulfonyl, or phosphonyl group(s) on the first carbon structure,
   wherein if the first carbon structure of the diluent comprises a hydroxyl group(s), the hydroxyl group(s) is adjacent to a carbonyl, phenyl, sulfonyl, or phosphonyl group(s);
 c) optionally, one or more surfactant(s), wherein the one or more surfactant(s) comprise:
  i) a second carbon structure of at least six carbon atoms, wherein the second carbon structure is a substituted or unsubstituted, saturated or unsaturated, linear or branched alkyl or heteroalkyl;
  ii) optionally one or more glyceryl, carbonyl, phenyl, sulfonyl, or phosphonyl group(s) on the second carbon structure,
   wherein if the second carbon structure of the surfactant comprises a hydroxyl group(s), the hydroxyl group(s) is adjacent to a carbonyl, phenyl, sulfonyl, or phosphonyl group(s);
 d) one or more rheology modifier(s); and
 e) optionally, one or more buffer(s);
wherein the liquid pesticide formulation exhibits 5% (w/w) or less loss of halosulfuron-methyl upon storage for 8 weeks at 40° C. measured using quantitative chromatography.

2. The liquid pesticide formulation of claim 1, wherein the first carbon structure includes from 6 to 66 carbon atoms.

3. The liquid pesticide formulation of claim 1, comprising:
 0.01-40% (w/w) of one or more pesticide(s);
 40-95% (w/w) of the one or more diluent(s);
 0-20% (w/w) of the one or more surfactant(s); and
 1 to 10% (w/w) of the one or more rheology modifier(s).

4. The liquid pesticide formulation of claim 1, comprising:
 5-30% (w/w) of one or more pesticide(s);
 40-90% (w/w) of the one or more diluent(s);
 5-10% (w/w) of the one or more surfactant(s); and
 1 to 5% (w/w) of the one or more rheology modifier(s).

5. The liquid pesticide formulation of claim 1, comprising:
 20-30% (w/w) of one or more pesticide(s);
 40-82% (w/w) of the one or more diluent(s);
 5-10% (w/w) of the one or more surfactant(s); and
 3-8% (w/w) of the one or more rheology modifier(s).

6. The liquid pesticide formulation of claim 1, further comprising one or more chemically stable pesticide(s).

7. The liquid pesticide formulation of claim 6, wherein the chemically stable pesticide is Benzobicyclon, Dicamba, or Prosulfuron.

8. The liquid pesticide formulation of claim 3, wherein the rheology modifier comprises silica.

9. The liquid pesticide formulation of claim 1, wherein the surfactant is an acid selected from oleic, caprylic, decanedioic, or linolenic, mono tertiary amine-PEG-trimerate, or a salt thereof.

10. The liquid pesticide formulation of claim 9, wherein the surfactant is a salt of the acid selected from sodium, potassium, lithium, magnesium, calcium, zinc, or aluminum salt, or a mixture of one or more of the foregoing salts and the acid.

11. The liquid pesticide formulation of claim 1, wherein the surfactant comprises at least one glyceryl group.

12. The liquid pesticide formulation of claim 11, wherein the surfactant is selected from tricaprylate glycerol, trioleate glycerol, tristearate glycerol, di-lineolate/monostearate glycerol, or mixtures thereof.

13. The liquid pesticide formulation of claim 1, wherein the surfactant comprises at least one sulfonyl group.

14. The liquid pesticide formulation of claim 13, wherein the surfactant is a sulfate or a sulfonate selected from mono/di oleyl sulfate, lauryl sulfate, dodecylbenzene sulfonate, oleyl sulfonate, 2-propenoic acid butyl ester polymer with ethenyl acetate and ethyenesulfonate, or a salt thereof.

15. The liquid pesticide formulation of claim 13, wherein the surfactant is the salt of the sulfate or sulfonate selected from sodium, potassium, lithium, magnesium, calcium, zinc, or aluminum salt, or a mixture of one or more of the foregoing salts and the acid form of the sulfate or sulfonate.

16. The liquid pesticide formulation of claim 1, wherein the surfactant comprises at least one phosphonyl group.

17. The liquid pesticide formulation of claim 16, wherein the surfactant is a phosphate or phosphonate selected from mono/di oleyl phosphonate, lauryl phosphonate, dodecylbenzene phosphonate, oleyl phosphonate, 2-propenoic acid butyl ester polymer with ethenyl acetate and ethyenephosphonate, and salts thereof.

18. The liquid pesticide formulation of claim 16, wherein the surfactant is salt of the phosphate or phosphonate selected from sodium, potassium, lithium, magnesium, calcium, zinc, or aluminum salt, or a mixture of one or more of the foregoing salts and the acid form of the phosphate or phosphonate.

19. The liquid pesticide formulation of claim 1, wherein the heteroalkyl in the first carbon structure and the second carbon structure each comprises oxygen as a heteroatom.

20. A method for controlling pest(s) on a lawn, garden, turf grass, crop field, non-crop area, or ornamentals comprising applying the liquid pesticide formulation of claim 1 to the lawn, the garden, the turf grass, the crop field, the non-crop area, or the ornamentals.

21. The method for controlling pest(s) of claim 20, wherein the crop field is selected from field corn, field corn grown for seed, grain sorghum (milo), rice, sugarcane, fallow ground, cotton, or dry beans, or combinations thereof.

22. The method for pests of claim 20, wherein the pest(s) include undesired vegetation selected from Alfalfa (*Medicago sativa*); Alligator weed (*Alternanthera philoxeroides*); Amaranth, palmer (*Amaranthus palmeri*); Amaranth, spiny (*Amaranth spinosus*); Artichoke, Jerusalem (*Helianthus tuberosus*); Barnyardgrass (*Echinochloa crusgalli*); Beggarweed, Florida (*Desmodium tortuosum*); Bindweed (*Calystegia sepium*); Bindweed, field (*Convolvulus arvensis*); Bindweed, hedge (*Calystegia sepium*); Buckwheat, wild; *Polygonum* (*convolvulus*); Buffalobur (*Solanum rostratum*); Burcucumber (*Sicyos angulatus*); Buttercup, hairy (*Ranunculus sardous*); California arrowhead (*Sagittaria montevidensis*); Carpetweed (*Mollugo verticillata*); Chamomile, mayweed (*Anthemis cotula*); Chervil, bur (*Anthriscus scandicina*); Chickweed, common (*Stellaria media*); Chickweed, mouse ear (*Cerastium vulgatum*); Clover, white (Dutch) (*Trifolium repens*); Cocklebur, common (*Xanthium strumarium*); Copperleaf, hophornbeam (*Acalypha ostryifolia*); Corn Spurry (*Spergula arvensis*); Cutleaf groundcherry (*Physalis angulata*); Dandelion, common (*Taraxacum officinale*); Dayflower (*Commelina erecta*); Dayflower, spreading (*Commelina diffusa*); Deadnettle, purple (*Lamium purpureum*); Devils Claw (*Proboscidea louisianica*); Dogbane, hemp (*Apocynum cannabinum*); Ducksalad (*Heteranthera limosa*); Early Watergrass (*Echinochloa oryzoides*); Eclipta (*Ecilpta prostrata*); Eveningprimrose, cutleaf (*Oenothera laciniata*); Fiddleneck, coast (*Amsinckia intermedia*); Fleabane, Philadelphia (*Erigeron philadelphicus*); Flixweed (*Descurainia Sophia*); Galinsoga (*Galinsoga* spp.); Galinsoga (*Galinsoga*); Galinsoga, hairy (*Galinsoga quadriradiata*); Garlic, wild (*Allium vineale*); Golden crownbeard (*Verbesina encelioides*); Goosefoot (*Chenopodium californicum*); Gromwell, corn (*Lithospermum arvense*); Groundsel, common (*Senecio vulgaris*); Henbit (*Lamium amplexicaule*); Horsenettle (*Solanum carolinense*); Horsetail (*Equisetum arvense*); Horseweed (Marestail) (*Conyza canadensis*); Horseweed/Marestail (*Erigeron canadensis*); Jimsonweed (*Datura stramonium*); Jointvetch (*Aeschynomene virginica*); Knotweed, prostrate (*Polygonum aviculare*); Kochia (*Kochia scoparia*); Kyllinga, Annual (*Kyllinga sesquiflorus*); Kyllinga, Green (*Kyllinga breviflora*); Ladysthumb (*Polygonum persicaria*); Lambsquarter, common (*Chenopodium album*); Late Watergrass/Rice Mimic (*Echinochloa phyllopogon*); Lettuce, miners (*Claytonia perfoliata*); Lettuce, prickly (*Lactuca serriola*); Mallow, common (*Malva neglecta*); Mallow, Venice (*Hibiscus trionum*); Mayweed chamomile (dog fennel) (*Anthemis cotula*); Milkweed, common (*Asclepias syriaca*); Milkweed, honeyvine (*Ampelamus albidus*); Monochoria (*Monochoria* spp); Morningglory, ivyleaf (*Ipomoea hederacea*); Morningglory, pitted (*Ipomoea lacunosa*); Morningglory, smallflower (*Jacquemontia tamnifolia*); Morningglory, tall & Ivyleaf (*Ipomoea* spp.); Morningglory, tall (*Ipomoea purpurea*); Mustard, blue (*Chorispora tenella*); Mustard, tumble (*Sisymbrium altissimum*); Mustard, wild (*Sinapis arevensis*); Nightshade, black (*Solanum* spp.); Nutsedge, Purple (*Cyperus rotundus*); Nutsedge, Yellow (*Cyperus esculentus*); Passionflower, maypop (*Passiflora incarnata*); Pennycress, field (*Thlaspi arvense*); Pepperweed, field (*Lepidium campestre*); Pepperweed, Virginia (*Lepidium virginicum*); Pigweed, redroot (*Amarunthus retrofiexus*); Pigweed, smooth (*Amaranthus hybridus*); Pigweed, tumble (*Amaranthus albus*); Pineappleweed (*Matricaria discoidea*); Plantain (*Plantago major*); Pokeweed, common (*Phytolacca Americana*); Puncturevine (*Tibulus terrestris*); Purslane (*Portulaca oleracea*); Purslane, common (*Portulaca oleracea*); Purslane, horse (*Trianthema portulacastrum*); Pursley, Florida (*Richardia scabra*); Radish, wild (*Raphanus raphanistrum*); Ragweed, common (*Ambrosia artemisiifolia*); Ragweed, giant (*Ambrosia trifida*); Redstem (*Ammania auriculata*); Ricefield bulrush (*Scirpus mucronatus*); Sesbania, hemp (*Sesbania exaltata*); Sharppoint fluvellin (*Kickxia elatine*), (*Kickxia elatine*); Shepherd's purse (*Capsella bursa-pastoris*); Sicklepod (*Cassia obtusifolia*); Sida, prickly (*Sida spinosa*); Smallflower umbrella sedge (*Cyperus difformis*); Smartweed, Annual (*Polygonum* spp.); Smartweed, Pennsylvania (*Polygonum pennsylvanicum*); Sowthistle, annual (*Sonchus oleraceus*); Sprangletop (*Leptochloa fascicularis*); Sunflower (*Helianthus annuus*); Sunflower (*Helianthus* spp.); Tansymustard (*Descurainia pinnata*); Texasweed (*Caperonia palustris*); Thistle, Canada (*Cirsium arvense*); Thistle, Russian (*Salsola iberica*); Velvetleaf (*Abutilan theophrasti*); Wallflower, bushy (*Erysimum repandum*); Water hyssop (*Bacopa.* spp); Waterhemp, common (*Amaranthus rudis*); Waterhemp, tall (*Amaranthus tuberculatus*); Waterhemp (*Amaranthus* spp); Willow herb, common (*Epilobium ciliatum*); Willowherb (*Epilobium ciliatum*); Yellowcress, creeping (*Rorippa sylvestris*), or combinations thereof.

23. A liquid pesticide formulation comprising:
3-40% (w/w) halosulfuron-methyl;
40-95% (w/w) of one or more diluent(s), wherein the diluent is a liquid comprising:
  i) a first carbon structure of at least six carbon atoms, the first carbon structure being a substituted or unsubstituted, saturated or unsaturated, linear or branched alkyl or heteroalkyl;
  ii) optionally one or more glyceryl, carbonyl, phenyl, sulfonyl, or phosphonyl group(s) on the first carbon chain, wherein if the diluent comprises a hydroxyl group(s) in its chemical structure, the hydroxyl group(s) is adjacent to a carbonyl, phenyl, sulfonyl, or phosphonyl group(s);
 0-20% (w/w) of one or more surfactant(s), wherein the surfactant is selected from sodium oleate, mono-$C_{10-16}$-alkylesters, calcium lignosulfonate, sodium dioctyl sulfosuccinate, potassium phosphate monobasic/potassium phosphate dibasic, phosphate ester, sodium dodecylbenzene sulfonate, acrylic-styrene copolymer salt, or mono tertiary amine-PEG-trimerate, or mixtures thereof; and
 1 to 10% (w/w) of one or more rheology modifier(s),
 wherein the liquid pesticide formulation exhibits 5% (w/w) or less loss of halosulfuron-methyl upon storage for 8 weeks at 40° C. measured using quantitative chromatography.

24. The liquid pesticide formulation of claim 23, wherein the heteroalkyl in the first carbon structure comprises oxygen as a heteroatom.

25. A liquid pesticide formulation comprising:
 20-30% (w/w) halosulfuron-methyl;
 40-82% (w/w) of one or more diluent(s), wherein the diluent is a liquid comprising:
  i) a first carbon structure of at least six carbon atoms, the first carbon structure being a substituted or unsubstituted, saturated or unsaturated, linear or branched, alkyl or heteroalkyl;
  ii) optionally one or more glyceryl, carbonyl, phenyl, sulfonyl, or phosphonyl group(s) on the first carbon chain, wherein if the diluent comprises a hydroxyl group(s) in its chemical structure, the hydroxyl group(s) is adjacent to a carbonyl, phenyl, sulfonyl, or phosphonyl group(s);
 5-10% (w/w) of one or more surfactant(s), wherein the surfactant is selected from sodium oleate, mono-$C_{10-16}$-alkylesters, calcium lignosulfonate, sodium dioctyl sulfosuccinate, potassium phosphate monobasic/potassium phosphate dibasic, phosphate ester, sodium dodecylbenzene sulfonate, acrylic-styrene copolymer salt, or mono tertiary amine-PEG-trimerate, or mixtures thereof; and
 3-8% (w/w) of one or more rheology modifier(s),
 wherein the liquid pesticide formulation exhibits 5% (w/w) or less loss of halosulfuron-methyl upon storage for 8 weeks at 40° C. measured using quantitative chromatography.

26. The liquid pesticide formulation of claim 25, wherein the heteroalkyl in the first carbon structure comprises oxygen as a heteroatom.

27. A liquid pesticide formulation comprising:
 a) halosulfuron-methyl;
 b) one or more diluent(s), where the diluent(s) is a liquid comprising:
  i) a first carbon structure of at least six carbon atoms, the first carbon structure being a substituted or unsubstituted, saturated or unsaturated, linear or branched alkyl or heteroalkyl;
  ii) optionally one or more glyceryl, carbonyl, phenyl, sulfonyl, or phosphonyl group(s) on the first carbon structure,
   wherein if the first carbon structure of the diluent comprises a hydroxyl group(s), the hydroxyl group(s) is adjacent to a carbonyl, phenyl, sulfonyl, or phosphonyl group(s);
 c) one or more surfactant(s), wherein the one or more surfactant(s) comprise:
  i) a second carbon structure of at least six carbon atoms wherein the second carbon structure is a substituted or unsubstituted, saturated or unsaturated, linear or branched alkyl or heteroalkyl;
  ii) optionally one or more glyceryl, carbonyl, phenyl, sulfonyl, or phosphonyl group(s) on the second carbon structure,
   wherein if the second carbon structure of the surfactant comprises a hydroxyl group(s), the hydroxyl group(s) is adjacent to a carbonyl, phenyl, sulfonyl, or phosphonyl group(s);
 d) one or more rheology modifier(s); and
 e) optionally, one or more buffering agents(s);
wherein the liquid pesticide formulation exhibits 5% (w/w) or less loss of halosulfuron-methyl upon storage for 8 weeks at 40° C. measured using quantitative chromatography.

28. The liquid pesticide formulation of claim 27, wherein the first carbon structure includes from 6 to 66 carbon atoms.

29. The liquid pesticide formulation of claim 27, comprising:
 0.01-40% (w/w) of one or more pesticide(s);
 50-97% (w/w) of the one or more surfactant(s); and
 1 to 10% (w/w) of the one or more rheology modifier(s).

30. The liquid pesticide formulation of claim 27, comprising:
 5-30% (w/w) of one or more pesticide(s);
 65-95% (w/w) of the one or more surfactant(s); and
 1 to 5% (w/w) of the one or more rheology modifier(s).

31. The liquid pesticide formulation of claim 27, comprising:
 20-30% (w/w) of one or more pesticide(s);
 67-80% (w/w) of the one or more surfactant(s); and
 3-5% (w/w) of the one or more rheology modifier(s).

32. The liquid pesticide formulation of claim 27, wherein the heteroalkyl in the first carbon structure and the second carbon structure each comprises oxygen as a heteroatom.

\* \* \* \* \*